United States Patent Office
2,765,295
Patented Oct. 2, 1956

2,765,295

BUTENE-1-ACRYLONITRILE-SO₂ TERPOLYMERS

Willie W. Crouch, Bartlesville, Okla., and John F. Howe, New York, N. Y., assignors to Phillips Petroleum Company, a corporation of Delaware No Drawing. Application February 18, 1952, Serial No. 272,261

5 Claims. (Cl. 260—79.3)

This invention relates to synthetic resins. In a more specific aspect, this invention relates to a process for the production of synthetic resinous materials formed by reaction between sulfur dioxide and unsaturated organic materials. In another of its more specific aspects, this invention relates to synthetic resinous materials formed by reaction between sulfur dioxide and unsaturated organic materials in which the unsaturation is between two adjacent carbon atoms and which interact with sulfur dioxide to form a resin. In another of its more specific aspects, this invention relates to these resins which have increased thermal stability at elevated temperatures.

It is well known that unstabilized resins produced from sulfur dioxide and unsaturated materials which are polymerizable therewith cannot be employed for the production of molded articles or of objects which are subjected to relatively high temperatures due to their limited thermal stability at such elevated temperatures. That is, in the temperature range required for molding operations, decomposition of the resins frequently occurs with the evolution of sulfur dioxide, unsaturated organic compounds, etc.

By the various aspects of this invention one or more of the following objects will be obtained.

An object of this invention is the production of resins which have thermal stability. A further object of this invention is the production of sulfur dioxide-unsaturated organic material resins which have increased thermal stability as a result of having incorporated therein as a copolymer minor amounts of acrylonitrile. A further object of this invention is the method for the production of these resins.

Further objects and advantages of our invention will become apparent, to one skilled in the art, from the accompanying disclosure and discussion.

It has now been found that the copolymerization of acrylonitrile with unsaturated organic material and sulfur dioxide results in a resinous product which is highly resistant to thermal decomposition and consequently these resins find uses in numerous fields in which the unstabilized resin cannot be employed. Organic compounds which enter into the formation of such resins include mono-olefins, cycloolefins, substituted aliphatic olefins such as styrene, diolefins such as butadiene, isoprene, cyclohexadiene, and the like, acetylenes and polyfunctional unsaturated compounds such as allyl alcohol, vinyl acetate, allyl ethyl ether, o-allylanisole, o-allylphenol, p-bromoallylbenzene, methyl undecylenate, undecylenyl alcohol, undecylenic acid, etc.

An important feature of this invention is that the stabilizing of the resin toward thermal decomposition can be effected by the use of relatively small quantities of acrylonitrile as a comonomer. It is thus possible to provide a stable resin of this type which retains all of its desired physical properties and is improved in its stability characteristics. It has been found that a copolymer resin prepared using as little as 0.5 to 1 mol per cent of acrylonitrile based on the total weight of olefinic material provides a marked decrease in the decomposition of the resin at elevated temperatures. Quantities of acrylonitrile up to 5 mol per cent will in most cases provide the major portion of the stabilizing. The use of quantities greater than 5 mol percent, such as up to 100 mol percent based on the total weight of olefin material provides in many cases an even more stable resin but the effect is much less in proportion to the quantity employed than is noted for the first 5 percent.

This invention is particularly effective in olefin-sulfur dioxide resins prepared from mono-olefins such as normal butenes, pentenes, octenes, 4-cyclohexylbutene-1 and the like, and cycloolefins such as cyclohexene, methylcyclohexene, etc. Acrylonitrile is added to the charge to the polymerizing zone and is thus copolymerized with the sulfur dioxide and olefin. The resins can be prepared by various methods, for example by reacting the olefin, acrylonitrile and sulfur dioxide in the presence of an excess of the sulfur dioxide as a reaction medium.

The reaction can also be carried out in the presence of acetone or other suitable solvent. An additional, and often preferred, method of preparing the resins is by reacting the olefin, acrylonitrile and sulfur dioxide by the emulsion polymerization method described in copending application Serial No. 8,755, filed February 16, 1948, by Willie W. Crouch and Ernest W. Cotten, now Patent No. 2,645,631. This patent discloses that, in the polymerization, it is generally found that substantially equimolar proportions of olefinic compound and sulfur dioxide react together. However, it is sometimes desired to use a molar excess of sulfur dioxide, say a 2:1 mol ratio of sulfur dioxide to olefinic material. In some cases it may even be desirable to use a higher ratio of the one reactant to the other for example, a ratio of 5:1, or greater, depending upon operating conditions, olefinic material employed, amount of aqueous medium, etc., although it appears that, even in such cases, equimolar quantities of sulfur dioxide, and olefinic compound, enter into reaction. When the polymerization is carried out in emulsion, the resin can be coagulated by addition of methanol, inorganic salts, etc. In some instances mixtures of various olefins can be employed in the preparation of the resins.

Advantages of this invention are illustrated by the following example. The reactants, and their proportions, and the other specific ingredients of the recipes are presented as being typical and should not be construed to limit the invention unduly.

*Example*

A series of olefin-acrylonitrile-sulfur dioxide resins was prepared by emulsion polymerization in a stainless steel autoclave. The recipe employed for the preparation of the resin employing a ratio of butene-1 to acrylonitrile of 99:1 parts by weight is given below. The samples in which larger quantities of acrylonitrile were used, as well as the controls, were made employing the same, or essentially the same, recipe. Unless otherwise indicated the resin was coagulated by use of magnesium sulfate at a temperature of about 140° F.

| Ingredients: | Parts by weight |
|---|---|
| Butene-1 | 46.2 |
| Acrylonitrile | 0.47 |
| Sulfur dioxide | 88.3 |
| Water | 180 |
| Ammonium nitrate | 0.5 |
| Maprofix MM [1] | 2.0 |

[1] Sodium lauryl sulfate dispersing agent commercially available in the form of a paste containing about 60 percent solids.

The polymerization was conducted for a period of 5.5 hours at a temperature of 100° F. A conversion of 92.5 percent was reached. At the end of the reaction period, the reactor was opened and excess sulfur dioxide was vented. The resin was coagulated at about 140° F. by addition of magnesium sulfate, separated by filtration, washed and dried in air.

Samples of the resins prepared using various proportions of acrylonitrile were tested for thermal stability by heating at 325° F. for different periods of time and measuring the loss in weight. The results are summarized in the following table:

| Resin | Percent Loss in Weight at End of X Hours' Heating at 325±2° F. | | |
|---|---|---|---|
| | ½ | 1 | 3 |
| 100 butene-1/0 acrylonitrile (control) | 6.2 | 9.8 | 17.0 |
| 99 butene-1/1 acrylonitrile | 3.3 | 5.7 | 10.8 |
| 97 butene-1/3 acrylonitrile | 2.1 | 3.6 | 6.7 |
| 94 butene-1/6 acrylonitrile | 1.9 | 3.1 | 5.6 |
| 90 butene-1/10 acrylonitrile [2] | 1.2 | 2.0 | 3.8 |
| 50 butene-1/50 acrylonitrile [3] | 0.8 | 1.3 | 2.4 |
| 100 butene-1 blend 1/0 acrylonitrile (control) [4] | 8.1 | 13.4 | 25.2 |
| 90 butene-1 blend 1/10 acrylonitrile | 1.8 | 2.9 | 5.1 |

[1] Commercial butene-1 fraction containing 69.9 weight percent 1-butene with the remainder being other $C_3$ and $C_4$ hydrocarbons.
[2] Resin coagulated at end of reaction period.
[3] Lithium nitrate used as catalyst and polymerization carried out at 86° F. Resin was coagulated at end of the reaction period.
[4] Resin coagulated with methyl alcohol.

To show that the acrylonitrile actually copolymerized in the resin, certain of these copolymers were analyzed for nitrogen and sulfur content. The following results were obtained:

| Ratio Butene-1 to Acrylonitrile | Nitrogen Content | | Sulfur Content | |
|---|---|---|---|---|
| | Calculated | Found | Calculated | Found |
| 99/1 | 0.12 | 0.10 | 26.67 | 26.4 |
| 97/3 | 0.37 | 0.19 | 26.69 | 26.1 |
| 94/6 | 0.74 | 0.35 | 26.74 | 25.6 |
| 90/10 | 1.2 | 0.96 | 26.77 | 26.1 |

Thus it is apparent that resins prepared by the process of this invention have a heat stability that makes them far superior to the unstabilized sulfur-dioxide-organic material resin. As many possible embodiments may be made of this invention without departing from the scope thereof, it is to be understood that all matter herein set forth is to be interpreted as illustrative and not in a limiting sense.

We claim:
1. As heat resistant resins, terpolymers of butene-1, acrylonitrile, and sulfur dioxide, the amount of said acrylonitrile being in the range of 1 to 10 parts by weight based upon 100 parts of said butene-1 and acrylonitrile, and the amount of said sulfur dioxide being at least stoichiometrically equivalent to said butene-1 and acrylonitrile, said heat resistant resins being substantially more heat resistant than the corresponding resin containing no acrylonitrile.

2. As heat resistant resins, terpolymers of 99 parts by weight of butene-1, one part by weight of acrylonitrile, and sulfur dioxide, the amount of said sulfur dioxide being at least stoichiometrically equivalent to said butene-1 and acrylonitrile, said resin being substantially more heat resistant than a resin of butene-1 and an equivalent amount of sulfur dioxide.

3. As heat resistant resins, terpolymers of 97 parts by weight of butene-1, three parts by weight of acrylonitrile, and sulfur dioxide, the amount of said sulfur dioxide being at least stoichiometrically equivalent to said butene-1 and acrylonitrile, said resin being substantially more heat resistant than a resin of butene-1 and an equivalent amount of sulfur dioxide.

4. As heat resistant resins, terpolymers of 94 parts by weight of butene-1, six parts by weight of acrylonitrile, and sulfur dioxide, the amount of said sulfur dioxide being at least stoichiometrically equivalent to said butene-1 and acrylonitrile, said resin being substantially more heat resistant than a resin of butene-1 and an equivalent amount of sulfur dioxide.

5. As heat resistant resins, terpolymers of 90 parts by weight of butene-1, ten parts by weight of acrylonitrile, and sulfur dioxide, the amount of said sulfur dioxide being at least stoichiometrically equivalent to said butene-1 and acrylonitrile, said resin being substantially more heat resistant than a resin of butene-1 and an equivalent amount of sulfur dioxide.

References Cited in the file of this patent
UNITED STATES PATENTS

| 2,241,900 | Brubaker | May 13, 1941 |
| 2,634,254 | Lipscomb | Apr. 7, 1953 |
| 2,692,872 | Fanning | Oct. 26, 1954 |
| 2,703,793 | Naylor | Mar. 8, 1955 |